(12) United States Patent
Choi et al.

(10) Patent No.: US 10,721,605 B2
(45) Date of Patent: Jul. 21, 2020

(54) METHOD OF CONFIGURING NETWORK BASED ON NEAR-FIELD COMMUNICATION (NFC) AND APPARATUS PERFORMING THE SAME

(71) Applicant: Electronics and Telecommunications Research Institute, Daejeon (KR)

(72) Inventors: Younghwan Choi, Daejeon (KR); Jung Soo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/013,169

(22) Filed: Jun. 20, 2018

(65) Prior Publication Data

US 2019/0132721 A1 May 2, 2019

(30) Foreign Application Priority Data

Oct. 26, 2017 (KR) .................. 10-2017-0140399
Jan. 18, 2018 (KR) .................. 10-2018-0006382

(51) Int. Cl.
| | | |
|---|---|---|
| H04W 4/80 | (2018.01) | |
| H04W 24/02 | (2009.01) | |
| H04L 12/24 | (2006.01) | |
| H04L 29/06 | (2006.01) | |

(52) U.S. Cl.
CPC ............... *H04W 4/80* (2018.02); *H04L 41/12* (2013.01); *H04W 24/02* (2013.01); *H04L 69/16* (2013.01)

(58) Field of Classification Search
CPC .......... H04L 41/12; H04W 24/02; H04W 4/80
See application file for complete search history.

(56) References Cited

U.S. PATENT DOCUMENTS

| | | | | |
|---|---|---|---|---|
| 2004/0156318 A1* | 8/2004 | Rune | .................... | H04W 92/02 370/235 |
| 2006/0190594 A1* | 8/2006 | Jorgenson | ......... | H04L 29/06027 709/224 |
| 2008/0137556 A1 | 6/2008 | Park et al. | | |
| 2013/0064072 A1* | 3/2013 | Vasseur | .................. | H04L 43/10 370/225 |
| 2013/0322296 A1* | 12/2013 | Arunan | .................. | H04L 61/20 370/254 |
| 2014/0330905 A1 | 11/2014 | Kwak et al. | | |

* cited by examiner

*Primary Examiner* — David Bilodeau
(74) *Attorney, Agent, or Firm* — Kile Park Reed & Houtteman PLLC

(57) ABSTRACT

Disclosed is a method and apparatus for configuring a network based on near-field communication (NFC), the method including determining whether NFC terminals access in a multi-hop range or a single hop range; classifying roles of the NFC terminals based on connections between the NFC terminals and neighboring communication terminals when the NFC terminals access in the multi-hop range; and classifying roles of the NFC terminals based on properties when the NFC terminals access in the single hop range.

18 Claims, 6 Drawing Sheets

METHOD OF CONFIGURING NETWORK BASED ON NEAR-FIELD COMMUNICATION (NFC) AND APPARATUS PERFORMING THE SAME

CROSS-REFERENCE TO RELATED APPLICATION(S)

This application claims the priority benefit of Korean Patent Application No. 10-2017-0140399 filed on Oct. 26, 2017 and Korean Patent Application No. 10-2018-0006382 filed on Jan. 18, 2018, in the Korean Intellectual Property Office, the disclosures of which are incorporated herein by reference for all purposes.

BACKGROUND

1. Field

One or more example embodiments relate to a method of configuring a network based on a near-field communication (NFC) and an apparatus performing the method.

2. Description of Related Art

Internet protocol version 6 (IPv6) communication-based network connectivity including a near-field communication (NFC) terminal device may have two types of connectivities which correspond to a case in which a terminal device is connected directly to the Internet and a case in which a network is configured using a plurality of NFC terminal devices connected to one another.

In the case in which the network is configured using the plurality of NFC terminal devices connected to one another, each of the NFC terminal devices may not have an Internet connectivity and the network may be an independent network temporarily like an ad-hoc network.

When configuring an NFC terminal device-based network, a communication performance may be maximized by applying characteristics thereof. Based on such characteristics, roles of a host and a router may be classified.

SUMMARY

An aspect provides a method and apparatus for configuring a network by applying near-field communication (NFC) characteristics on an independent network to solve a technical task for improving a performance in an Internet protocol version 6 (IPv6) low-power networking technique.

According to an aspect, there is provided a method of configuring a network based on near-field communication (NFC), the method including determining whether NFC terminals access in a multi-hop range or a single hop range, classifying roles of the NFC terminals based on connections between the NFC terminals and neighboring communication terminals when the NFC terminals access in the multi-hop range, and classifying roles of the NFC terminals based on properties when the NFC terminals access in the single hop range.

The properties may include at least one of an energy level, a maximum transfer unit (MTU), and a connectivity.

The method may further include transferring information on the properties using a logical link control protocol (LLCP) during connection initialization.

The determining may include determining whether each of the NFC terminals has the same number of links, determining that the NFC terminals access in the single hop range when each of the NFC terminals has the same number of links, and determining that the NFC terminals access in the multi-hop range when at least one of the NFC terminals has a different number of links.

The classifying of the roles of the NFC terminals based on the connections between the NFC terminals and the neighboring communication terminals may include classifying, as a host, an NFC terminal having one link among the NFC terminals and classifying, as a router, an NFC terminal having at least two links among the NFC terminals.

The classifying of the roles of the NFC terminals based on the properties may include classifying one of the NFC terminals as a router when the properties are equal and classifying a high-performance device among the NFC terminals as a router when the properties are not equal.

The classifying of the high-performance device among the NFC terminals as the router may include determining an NFC terminal having a highest residual energy level among the NFC terminals to be the high-performance device based on an energy level.

The classifying of the high-performance device among the NFC terminals as the router may include determining an NFC terminal having an MTU greater than a threshold among the NFC terminals to be the high-performance device based on the MTU.

The classifying of one of the NFC terminals as the router may include classifying one of the NFC terminals as the router based on an address value.

An NFC terminal having a smallest address value among the NFC terminals may be the classified one NFC terminal.

According to another aspect, there is also provided an apparatus for configuring a network based on NFC, the apparatus including a processor configured to execute instructions to configure a network using NFC terminals, wherein when the instructions are executed, the processor is configured to perform determining whether NFC terminals access in a multi-hop range or a single hop range, classifying roles of the NFC terminals based on connections between the NFC terminals and neighboring communication terminals when the NFC terminals access in the multi-hop range, and classifying roles of the NFC terminals based on properties when the NFC terminals access in the single hop range.

The properties may include at least one of an energy level, an MTU, and a connectivity.

The processor may be further configured to perform transferring information on the properties using an LLCP during connection initialization.

The determining may include determining whether each of the NFC terminals has the same number of links, determining that the NFC terminals access in the single hop range when each of the NFC terminals has the same number of links, and determining that the NFC terminals access in the multi-hop range when at least one of the NFC terminals has a different number of links.

The classifying of the roles of the NFC terminals based on the connections between the NFC terminals and the neighboring communication terminals may include classifying, as a host, an NFC terminal having one link among the NFC terminals and classifying, as a router, an NFC terminal having at least two links among the NFC terminals.

The classifying of the roles of the NFC terminals based on the properties may include classifying one of the NFC terminals as a router when the properties are equal and classifying a high-performance device among the NFC terminals as a router when the properties are not equal.

The classifying of the high-performance device among the NFC terminals as the router may include determining an NFC terminal having a highest residual energy level among the NFC terminals to be the high-performance device based on an energy level.

The classifying of the high-performance device among the NFC terminals as the router may include determining an NFC terminal having an MTU greater than a threshold among the NFC terminals to be the high-performance device based on the MTU.

The classifying of one of the NFC terminals as the router may include classifying one of the NFC terminals as the router based on an address value.

An NFC terminal having a smallest address value among the NFC terminals may be the classified one NFC terminal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
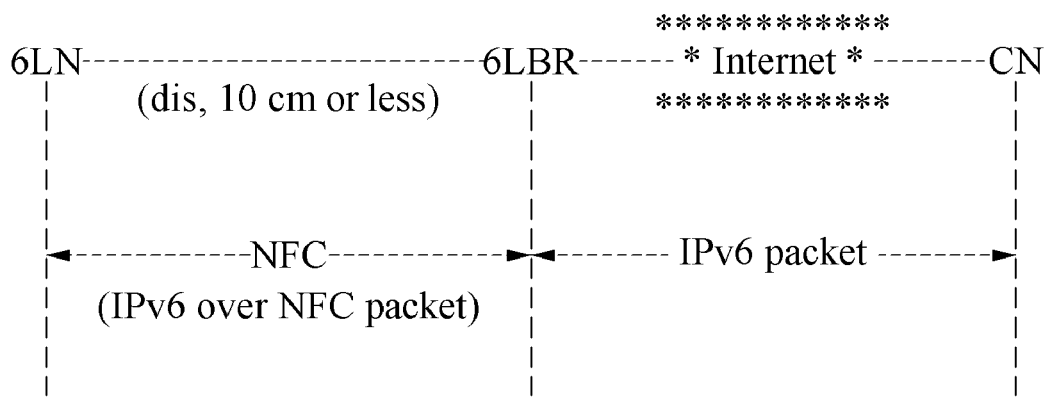
FIGS. 1A and 1B illustrate examples of an Internet protocol version 6 (IPv6) communication-based network connectivity including a near-field communication (NFC) terminal.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described with reference to the accompanying drawings. It should be understood, however, that there is no intent to limit this disclosure to the particular example embodiments disclosed. Like numbers refer to like elements throughout the description of the figures.

Figure 1B:
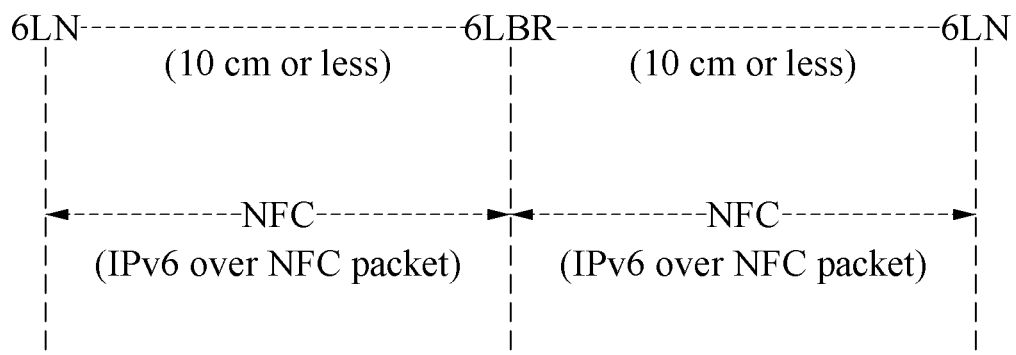

FIGS. 1A and 1B illustrate examples of an Internet protocol version 6 (IPv6) communication-based network connectivity including a near-field communication (NFC) terminal.

Referring to FIGS. 1A and 1B, the NFC terminal or an NFC terminal device may have two types of connectivity. FIG. 1A illustrates a case in which an NFC terminal 6LN is directly connected to the Internet. FIG. 1B illustrates a case in which a plurality of NFC terminals 6LN and 6LR are mutually connected to configure a network.

FIG. 1B illustrates an independent network that is temporarily formed like an ad-hoc network and does not have an Internet connectivity for each of the NFC terminals.

Each of the NFC terminals included in an IPv6-based low-power network may perform one of roles of a host and a router. The roles and functions corresponding to the roles are described as follows.

Host

A host may be a communication terminal included in a low-power network and refer to the host or the router.

Router

A router may connect two terminals transmitting and receiving a router advertisement (RA) or router solicitation (RS) message in the low-power network and forward an IPv6 packet. When a router is located on a boundary of a network, at least one router may be present in the network as a router connecting two independent low-power networks or connecting an independent low-power network and another IP network, and may perform a role of propagating an IPv6 prefix address. The independent low-power network may include a boundary router for IPv6 propagation.

The low-power wireless network as shown in FIG. 1B may be provided in various forms. Hereinafter, methods of configuring networks in different forms will be described.

Figure 2:
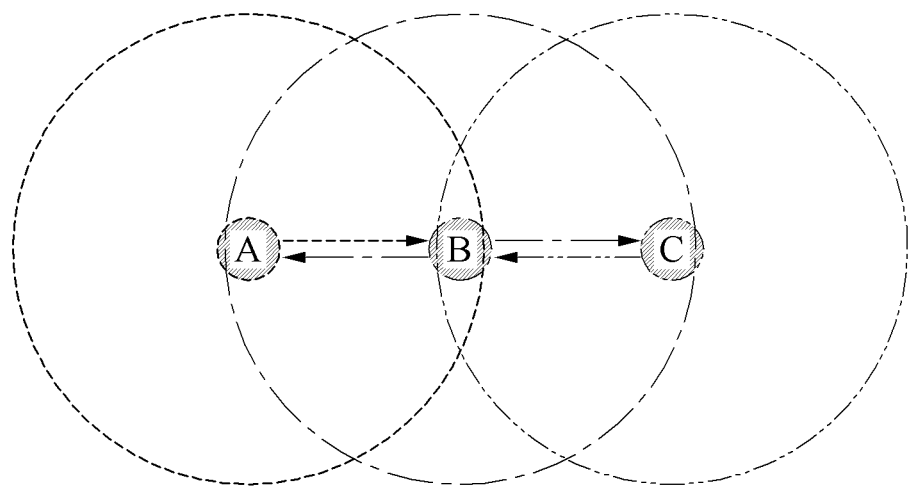
FIG. 2 is a diagram illustrating a connectivity in a multi-hop network among independent low-power wireless networks.

FIG. 2 is a diagram illustrating a connectivity in a multi-hop network among independent low-power wireless networks.

When not all of NFC terminals are present in a single hop range, multi-hop communication may be needed among all NFC terminals included in a network. FIG. 2 illustrates an example of a network configured with three NFC terminals.

In the example of FIG. 2, A, B, and C represent NFC terminals. The NFC terminals may have different types of connectivity. B may have a connectivity to two terminals, A and C. A and C may each have a connectivity to one terminal, B. As such, an NFC terminal having a connectivity to at least two terminals may perform a role of a router and an NFC terminal having a connectivity to one terminal may perform a role of a host.

Figure 3:
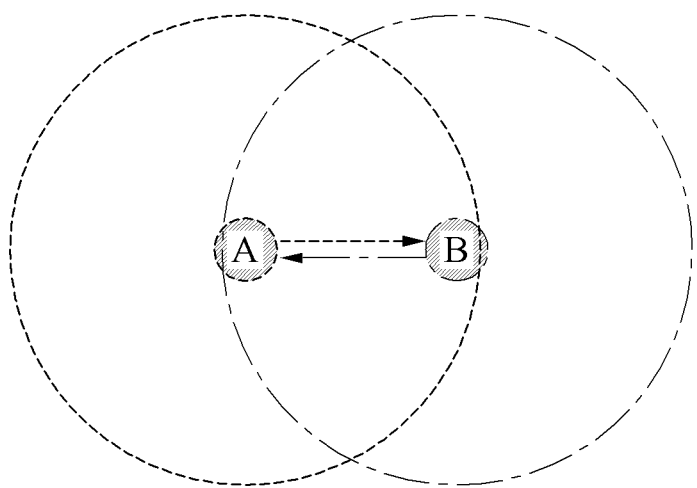
FIG. 3 is a diagram illustrating a connectivity in a single hop network among independent low-power wireless networks.
Figure 4:
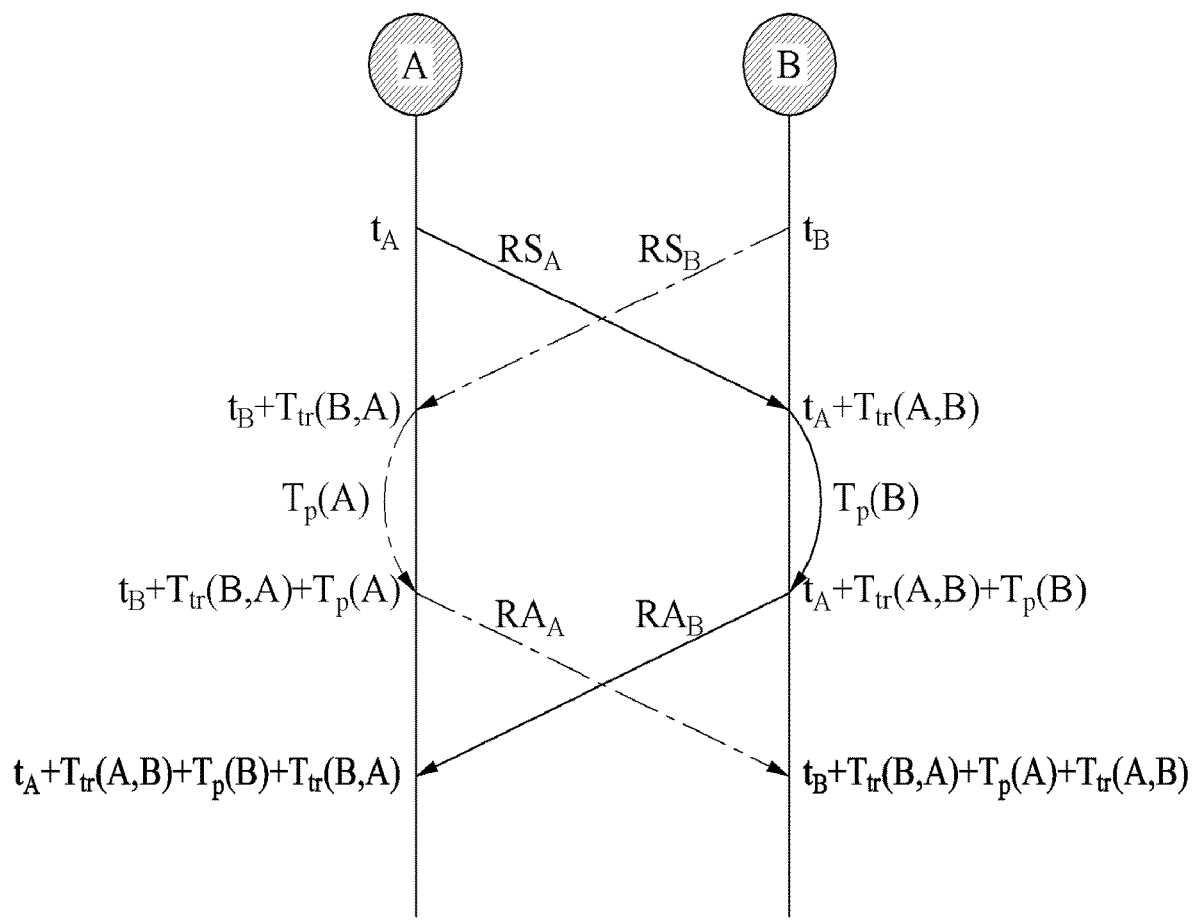
FIG. 4 illustrates an example of a message exchange process for securing a connectivity between two NFC terminals in a single hop network.

FIG. 3 is a diagram illustrating a connectivity in a single hop network among independent low-power wireless networks and FIG. 4 illustrates an example of a message exchange process for securing a connectivity between two NFC terminals in a single hop network.

Referring to FIG. 3, when all NFC terminals included in a network are present in a single hop range, the NFC terminals may have the same number of connectivity. FIG. 3 illustrates an example of a minimum unit of an independent network having the same connectivity.

In a low-power wireless network based on IPv6 communication, NFC terminals A and B may perform a message exchange process for securing a connectivity. The NFC terminals may basically perform a role of a host. Thus, the NFC terminals may transmit a message for retrieving a router and receiving a response message of the message.

Referring to FIG. 4, $t_A$ denotes a time at which the NFC terminal A is to transmit a message, $t_B$ denotes a time at which the NFC terminal B is to transmit a message, $T_{tr}(X,Y)$ denotes a period of time in which the messages are transmitted to the NFC terminals A and B, and $T_p(X)$ denotes a time required for processing the received message in each of the NFC terminals A and B. In general, only if $t_B+T_{tr}(B, A)+T_p(A)<t_A$, the NFC terminal may be determined to be the router.

Except for the aforementioned case, the role of the router may be performed by a communication terminal that provides a higher network performance between the communication terminals A and B based on a communication terminal performance and an environmental characteristic.

In a case of temporary network configuration as illustrated in FIG. 1B, a node for centralized network management such as a server-client form may need to be selected.

An NFC terminal may have unique characteristics differing from those of other terminals, for example, Bluetooth and wireless fidelity (Wi-Fi)-based communication devices. Thus, when configuring an NFC-terminal based network, such characteristics may be applied to achieve a maximum communication performance. Roles of the host and the router may be classified for each type of networks based on the unique characteristics of the NFC terminal.

Hereinafter, a method of configuring a network by applying an NFC property based on a retrieval between IPv6-based NFC terminal devices in an independent network and an apparatus performing the method will be described.

Figure 5:
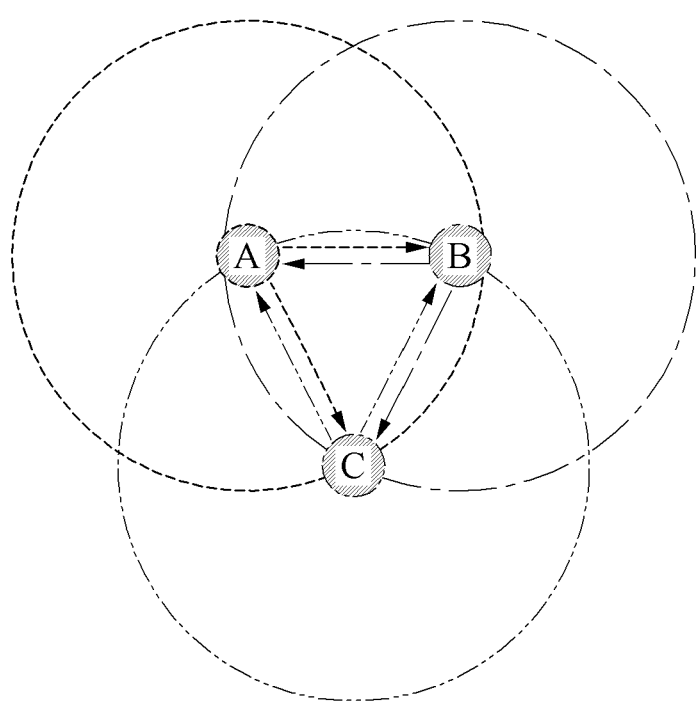
FIG. 5 is a diagram illustrating a method of configuring a network by applying characteristics of an NFC in an independent network according to an example embodiment.

FIG. 5 is a diagram illustrating a method of configuring a network by applying characteristics of an NFC in an independent network according to an example embodiment.

FIG. 5 illustrates an example in which three NFC terminals are provided. However, embodiments are applicable to any single-hop network configuration including at least three NFC terminals, thereby maximizing a performance. The NFC terminals may be based on, for example, IPv6 communication.

The embodiments are described based on an example in which n (n being a natural number greater than or equal to 3, for example, n>2) NFC terminals configure an independent single-hop network and an example in which each of the NFC terminals equally has n−1 connectivities or the same number of links.

As illustrated in FIG. 5, when an independent network, for example, a single hop network including three NFC terminals is present, the NFC terminals may have the two same connectivities or the same number of links. In this example, depending on which terminal performs a role of a router, an overall network performance may be affected.

When the NFC terminals meet in a single hop and have the same property, one of the NFC terminals may be determined to be the router.

When the NFC terminals meet in the single hop and have different properties, a high-performance device, for example, a performance-outstanding device between the NFC terminals may be determined to be the router.

The property may include a maximum transfer unit (MTU), an energy level, for example, a level of remaining energy, and a connectivity. The NFC terminals may transmit property information to neighboring NFC terminals, for example, neighboring NFC terminals with which an independent network is to be configured, using a logical link control protocol (LLCP) during connection initialization.

To determine the role of the router, the NFC terminals may use the MTU. When having a connectivity in a link layer, for example, a logic link layer, the NFC terminals may arbitrarily determine a variable MTU.

An IPv6 packet may be received in the LLCP of a protocol of the NFC and transmitted to information fields of unnumbered information protocol data unit (UI PDU) and I PDU of the LLCP of the NFC terminal. The information field of the I PDU may include a single service data unit. A maximum number of octets in an information field may be determined based on a maximum information unit (MIU) with respect to a data link connection. The MIU may be a MTU. Each of local and remote LLCs may set a distinct MIU value for a data link connection end point and maintain the set distinct MIU value. Also, the LLC may transmit an MIU extension (MIUX) parameter in the information field, thereby announcing a large MIU for the data link connection. When the MIUX parameter is not transmitted, a default MIU value may be used. Otherwise, an MIU value may be calculated with respect to an MUT size in the LLCP of the NFC as shown in Equation 1 below.

$$MIU=128+MIUX \qquad [\text{Equation 1}]$$

As such, the variable MTU may be a property to be used based on a communication situation of NFC terminals in an independent low-power wireless network configured with only NFC terminals.

For example, when considering MTUs of communication terminals A, B, and C, a link between the communication terminals A and B may have 128 bytes basically and a link between the communication terminals B and C and a link between the communication terminals A and C may be determined to be 1280 bytes, for example, a minimum IPv6 MTU is the same. In this example, when a single IPv6 packet of 1280 bytes is to be transmitted, the IPv6 packet of 1280 bytes may be divided into 128-byte packets to be transmitted ten times using a link between the communication terminals A and B, and the IPv6 packet of 1280 bytes may be transmitted once using a multi-hop link among the communication terminals A, B, and C. In this example, the communication terminal B may perform the role of the router. As such, when determining a terminal that is to perform the role of the router, an NFC property, for example, the MTU property may be considered.

In such case in which the NFC terminals meet in the single hop and configure the independent low-power wireless network, the network may be configured by verifying whether a network performance is associated with energy or a speed based on a distinct variable MTU property.

An operation performed by each of the NFC terminals, which can perform a single hop communication, to configure a wireless network will be described with reference to FIGS. 6 and 7.

Figure 6:
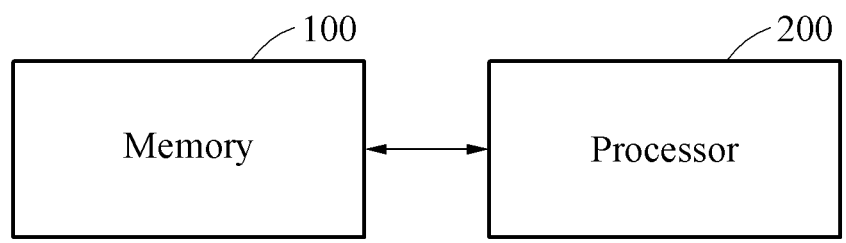
FIG. 6 is a block diagram illustrating an NFC terminal configuring a network by applying characteristics of an NFC in an independent network according to an example embodiment.
Figure 7:
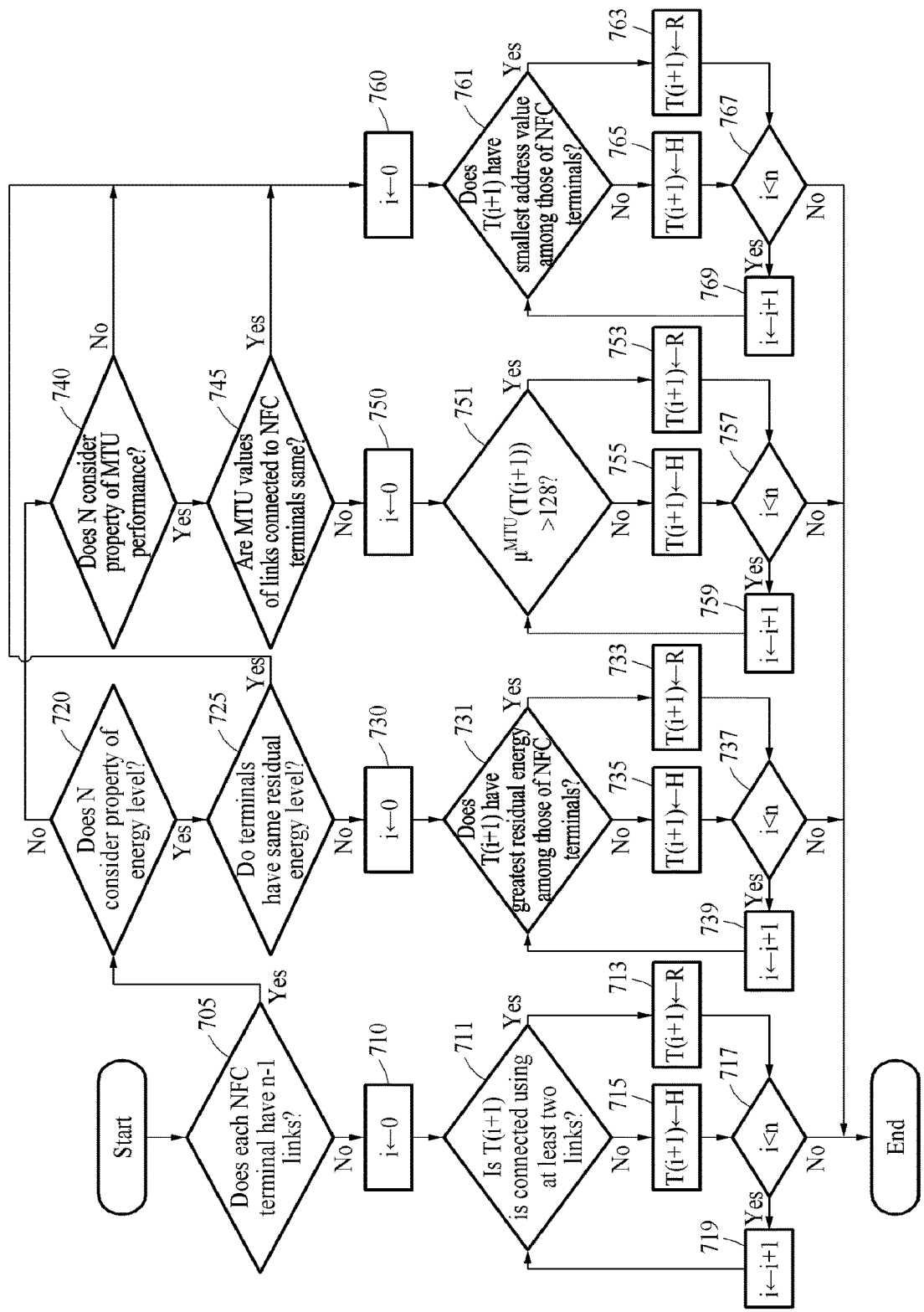
FIG. 7 illustrates an algorithm used to explain an example of configuring a network using the NFC terminal of FIG. 6.

FIG. 6 is a block diagram illustrating an NFC terminal configuring a network by applying characteristics of an NFC in an independent network according to an example embodiment and FIG. 7 illustrates an algorithm used to explain an example of configuring a network using the NFC terminal of FIG. 6.

Referring to FIGS. 6 and 7, the NFC terminal 10 may be a low-power wireless communication device. The NFC terminal 10 may be implemented as any NFC-based Internet of things (IoT) device. The NFC terminal 10 may also be implemented as a personal computer (PC), a data server, or a portable device.

The portable device may be implemented as, for example a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld console, an e-book, and a smart device. The smart device may be implemented to be, for example, a smart watch and a smart band.

The NFC terminal 10 may include a memory 100 and a processor 200.

The memory 100 may include instructions or programs to be executed by the processor 200. The instructions may be, for example, instructions for performing at least one operation of controlling the NFC terminal 10 to configure a wireless network together with neighboring NFC terminals.

Also, the memory 100 may store data to be calculated by the processor 200. The memory 100 may be implemented as a volatile memory device or a non-volatile memory device.

The volatile memory device may be implemented as, for example, dynamic random access memory (DRAM), static random access memory (SRAM), thyristor RAM (T-RAM), zero capacitor RAM (Z-RAM), or twin transistor RAM (TTRAM).

The non-volatile memory device may be implemented as, for example, electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, molecular electronic memory device, or insulator resistance change memory.

The processor 200 may control an overall operation of the NFC terminal 10. The processor 200 may be implemented as at least one processor including one or more cores.

The processor 200 may execute instructions for configuring a wireless network together with neighboring NFC terminals. The instructions may be implemented or embedded in the processor 200.

Also, the processor 200 may retrieve, fetch, or read the instructions from the memory 100 to execute the instructions. The processor 200 may write or record at least one execution result in the memory 100 or another memory (not shown), for example, an internal register, an internal cache, or a storage.

As such, the processor 200 may perform at least one operation of controlling the NFC terminal 10 to configure the wireless network together with the neighboring NFC terminals. The processor 200 may be controlled to configure the wireless network by performing an algorithm as described with reference to FIG. 7.

Referring to FIG. 7, R denotes a router, H denotes a host, N denotes a network, T(i) denotes an $i^{th}$ NFC terminal included in the network, n denotes a total number of NFC terminals in the network, and $\mu^{MTU}$ (T(i)) denotes an MTU value of a link connected with T(i).

In operation 705, the processor 200 may determine whether NFC terminals including the NFC terminal 10 have the same number of links, for example, n−1 links to determine whether the NFC terminals access in a multi-hop range or a single hop range.

When the NFC terminals have the same number of links, the processor 200 may determine that the NFC terminals access in a single hop range. When at least one of the NFC terminals has a different number of links, the processor 200 may determine that the NFC terminals access in a multi-hop range.

The processor 200 may configure a network by differently classifying roles of the NFC terminals depending on whether the NFC terminals access in the multi-hop range or the single hop range.

<Method of Configuring Network in Multi-Hop Range>

When the NFC terminals access in the multi-hop range, the processor 200 may classify the roles of the NFC terminals based on connections with neighboring communication terminals to configure the network.

In operation 710, the processor 200 may set "0" for i.

In operation 711, the processor 200 may determine whether T(i+1) is connected to at least two links. When T(i+1) is connected to at least two links, the processor 200 may classify T(i+1) as R in operation 713. When T(i+1) is not connected to at least two links, for example, when T(i+1) is connected to at most one link, the processor 200 may classify T(i+1) as H in operation 715.

The processor 200 may compare i and n in operation 717. When n is greater than i, the processor 200 may set i by adding "1" to i in operation 719. Thereafter, the processor 200 may perform operations 711 through 717. The processor 200 may repetitively perform operations 711 through 719 until all the roles of the NFC terminals are classified.

When n is less than or equal to i, the processor 200 may terminate network configuration.

When not all of terminals included in the network are present in a single hop, terminals having a connectivity with at least two neighboring terminals may perform a role as a router.

<Method of Configuring Network in Single Hop Range>

When the NFC terminals access in the single hop range, the processor 200 may configure the network by classifying the roles of the NFC terminals based on properties.

The processor 200 may classify the roles of the NFC terminals using at least one of the properties, for example, an energy level, an MTU, and a connectivity. In this example, the processor 200 may classify a high-performance device among the NFC terminals as a router.

When the properties are the same, the processor 200 may classify one of the NFC terminals as the router. In this example, the processor 200 may classify one of the NFC terminals as the router based on an address value.

1. Consideration of Energy Level Property

In operation 720, the processor 200 may determine whether a network considers an energy level property. In operation 725, the processor 200 may determine whether the NFC terminals have the same residual energy level to classify roles of the NFC terminals.

In operation 730, the processor 200 may set "0" for i.

In operation 731 the processor 200 may determine whether T(i+1) has a greatest residual energy among the NFC terminals. When T(i+1) has the greatest residual energy, the processor 200 may classify T(i+1) as R in operation 733. When T(i+1) does not have the greatest residual energy, the processor 200 may classify T(i+1) as H in operation 735.

In operation 737, the processor 200 may compare i and n. When n is greater than i, the processor 200 may set i by adding "1" to i in operation 739. Thereafter, the processor 200 may perform operations 731 through 737. The processor 200 may repetitively perform operations 731 through 739 until all the roles of the NFC terminals are classified.

When n is less than or equal to i, the processor 200 may terminate network configuration.

2. Consideration of MTU Property

In operation 740, the processor 200 may determine whether the network considers an MTU property or performance. In operation 745, the processor 200 may determine whether MTU values of links connected to the NFC terminals are the same to classify roles of the NFC terminals.

In operation 750, the processor 200 set "0" for i.

In operation 751, the processor 200 may compare an MTU value of T(i+1) to a threshold. When the MTU value of T(i+1) is greater than the threshold, the processor 200 may classify T(i+1) as R in operation 753. When the MTU value of T(i+1) is less than or equal to the threshold, the processor 200 may classify T(i+1) as H in operation 755. The threshold may be, for example, 128 bytes.

In operation 757, the processor 200 may compare i and n. When n is greater than i, the processor 200 may set i by adding "1" to i in operation 759. Thereafter, the processor 200 may perform operations 751 through 757. The processor 200 may repetitively perform operations 751 through 759 until all the roles of the NFC terminals are classified.

When n is less than or equal to i, the processor 200 may terminate network configuration.

3. Configuration of Address Value

When the network does not consider the properties, or when the properties are the same, the processor 200 may classify the roles of the NFC terminals based on address values.

In operation 760, the processor 200 may set "0" for i.

In operation 761, the processor 200 may determine whether T(i+1) has a smallest address value among those of the NFC terminals. When T(i+1) has the smallest address value, the processor 200 may classify T(i+1) as R in operation 763. When T(i+1) does not have the smallest address value, the processor 200 may classify T(i+1) as H in operation 765.

In operation 767, the processor 200 may compare i and n. When n is greater than i, the processor 200 may set i by adding "1" to i in operation 769. Thereafter, the processor 200 may perform operations 761 through 767. The processor 200 may repetitively perform operations 761 through 769 until all the roles of the NFC terminals are classified.

When n is less than or equal to i, the processor 200 may terminate network configuration.

According to an aspect, it is possible to configure a network that maximally provides energy and network performance based on technical characteristics, for example, a variable MTU of NFC.

As described above, the present disclosure may be applicable to a network having a variety of dynamic phase changes such as the IoT and an NFC-based service and added value may be provided when NFC technology is applied to devices such as a mobile phone.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of configuring a network based on near-field communication (NFC), the method comprising:
    determining whether NFC terminals access in a multi-hop range or a single hop range;
    classifying roles of the NFC terminals based on connections between the NFC terminals and neighboring communication terminals when the NFC terminals access in the multi-hop range; and
    classifying roles of the NFC terminals based on properties when the NFC terminals access in the single hop range,
    wherein the classifying of the roles is classifying as a router or a host depending on the multi-hop range or single hop range,
    wherein the determining of the access is determining that the NFC terminals access in the single hop range or the multi-hop range depending on whether each of the NFC terminals has the same number of links.

2. The method of claim 1, wherein the properties include at least one of an energy level, a maximum transfer unit (MTU), and a connectivity.

3. The method of claim 1, further comprising:
    transferring information on the properties using a logical link control protocol (LLCP) during connection initialization.

4. The method of claim 1, wherein the determining comprises:
    determining whether each of the NFC terminals has the same number of links;
    determining that the NFC terminals access in the single hop range when each of the NFC terminals has the same number of links; and
    determining that the NFC terminals access in the multi-hop range when at least one of the NFC terminals has a different number of links.

5. The method of claim 4, wherein the classifying of the roles of the NFC terminals based on the connections between the NFC terminals and the neighboring communication terminals comprises:
    classifying, as a host, an NFC terminal having one link among the NFC terminals; and
    classifying, as a router, an NFC terminal having at least two links among the NFC terminals.

6. The method of claim 4, wherein the classifying of the roles of the NFC terminals based on the properties comprises:
    classifying one of the NFC terminals as a router when the properties are equal; and
    classifying a high-performance device among the NFC terminals as a router when the properties are not equal.

7. The method of claim 6, wherein the classifying of the high-performance device among the NFC terminals as the router comprises:
    determining an NFC terminal having a highest residual energy level among the NFC terminals to be the high-performance device based on an energy level.

8. The method of claim 6, wherein the classifying of the high-performance device among the NFC terminals as the router comprises:
    determining an NFC terminal having an MTU greater than a threshold among the NFC terminals to be the high-performance device based on the MTU.

9. The method of claim 6, wherein the classifying of one of the NFC terminals as the router comprises:
    classifying one of the NFC terminals as the router based on an address value.

10. The method of claim 9, wherein an NFC terminal having a smallest address value among the NFC terminals is the classified one NFC terminal.

11. An apparatus for configuring a network based on near-field communication (NFC), the apparatus comprising:
    a processor configured to execute instructions to configure a network using NFC terminals,
    wherein when the instructions are executed, the processor is configured to perform:
    determining whether NFC terminals access in a multi-hop range or a single hop range;
    classifying roles of the NFC terminals based on connections between the NFC terminals and neighboring communication terminals when the NFC terminals access in the multi-hop range; and
    classifying roles of the NFC terminals based on properties when the NFC terminals access in the single hop range,
    wherein the classifying of the roles is classifying as a router or a host depending on the multi-hop range or single hop range,
    wherein the determining of the access is determining that the NFC terminals access in the single hop range or the multi-hop range depending on whether each of the NFC terminals has the same number of links.

12. The apparatus of claim 11, wherein the processor is further configured to perform transferring information on the properties using a logical link control protocol (LLCP) during connection initialization.

13. The apparatus of claim 11, wherein the determining comprises:
   determining whether each of the NFC terminals has the same number of links;
   determining that the NFC terminals access in the single hop range when each of the NFC terminals has the same number of links; and
   determining that the NFC terminals access in the multi-hop range when at least one of the NFC terminals has a different number of links.

14. The apparatus of claim 13, wherein the classifying of the roles of the NFC terminals based on the connections between the NFC terminals and the neighboring communication terminals comprises:
   classifying, as a host, an NFC terminal having one link among the NFC terminals; and
   classifying, as a router, an NFC terminal having at least two links among the NFC terminals.

15. The apparatus of claim 13, wherein the classifying of the roles of the NFC terminals based on the properties comprises:
   classifying one of the NFC terminals as a router when the properties are equal; and
   classifying a high-performance device among the NFC terminals as a router when the properties are not equal.

16. The apparatus of claim 15, wherein the classifying of the high-performance device among the NFC terminals as the router comprises:
   determining an NFC terminal having a highest residual energy level among the NFC terminals to be the high-performance device based on an energy level.

17. The apparatus of claim 15, wherein the classifying of the high-performance device among the NFC terminals as the router comprises:
   determining an NFC terminal having an MTU greater than a threshold among the NFC terminals to be the high-performance device based on the MTU.

18. The apparatus of claim 15, wherein the classifying of one of the NFC terminals as the router comprises:
   classifying one of the NFC terminals as the router based on an address value.

* * * * *